United States Patent
Puhakka

(10) Patent No.: US 10,382,360 B2
(45) Date of Patent: Aug. 13, 2019

(54) SESSION TERMINATION IN A MOBILE PACKET CORE NETWORK

(75) Inventor: Antti Juho Puhakka, Lohja (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/374,592

(22) PCT Filed: Jan. 27, 2012

(86) PCT No.: PCT/EP2012/051308
§ 371 (c)(1),
(2), (4) Date: Jul. 25, 2014

(87) PCT Pub. No.: WO2013/110341
PCT Pub. Date: Aug. 1, 2013

(65) Prior Publication Data
US 2015/0009896 A1   Jan. 8, 2015

(51) Int. Cl.
| | |
|---|---|
| H04L 12/741 | (2013.01) |
| H04L 12/933 | (2013.01) |
| H04L 12/24 | (2006.01) |
| H04L 12/14 | (2006.01) |
| H04L 12/851 | (2013.01) |
| H04L 12/859 | (2013.01) |

(Continued)

(52) U.S. Cl.
CPC .......... *H04L 49/15* (2013.01); *H04L 12/1407* (2013.01); *H04L 41/0816* (2013.01); *H04L 41/0826* (2013.01); *H04L 41/5025* (2013.01); *H04L 47/2475* (2013.01); *H04L 47/2483* (2013.01); *H04W 76/30* (2018.02); *H04L 47/14* (2013.01)

(58) Field of Classification Search
CPC ..... H04L 12/1407; H04L 47/10; H04L 47/24; H04L 47/2483; H04W 76/064
See application file for complete search history.

(56) References Cited

U.S. PATENT DOCUMENTS

| | | | | |
|---|---|---|---|---|
| 8,432,871 B1 * | 4/2013 | Sarnaik | ............. | H04W 28/0289 370/331 |
| 8,588,056 B1 * | 11/2013 | Choi | ....................... | H04L 43/16 370/216 |
| 2003/0182580 A1 | 9/2003 | Lee | | |

(Continued)

FOREIGN PATENT DOCUMENTS

| | | |
|---|---|---|
| CN | 101068229 A | 11/2007 |
| CN | 101448283 A | 6/2009 |

(Continued)

OTHER PUBLICATIONS

International Search Report dated Sep. 26, 2012 corresponding to International Patent Application No. PCT/EP2012/051308.

(Continued)

*Primary Examiner* — Scott M Sciacca
(74) *Attorney, Agent, or Firm* — Squire Patton Boggs (US) LLP

(57) ABSTRACT

A gateway device of a mobile packet core network matches (S31) data packets flowing to/from the mobile packet core network, using a filter, and terminates (S33) a session in accordance with an action for the filter when a data packet of the session, which flows to/from the mobile packet core network, matches the filter (S32).

12 Claims, 2 Drawing Sheets

(51) Int. Cl.
*H04W 76/30* (2018.01)
*H04L 12/801* (2013.01)

(56) References Cited

U.S. PATENT DOCUMENTS

| | | | | |
|---|---|---|---|---|
| 2004/0093513 | A1* | 5/2004 | Cantrell | H04L 12/2602 726/23 |
| 2007/0147247 | A1* | 6/2007 | Kalonji | H04L 12/5695 370/235 |
| 2008/0196099 | A1* | 8/2008 | Shastri | H04L 12/581 726/12 |
| 2009/0323703 | A1* | 12/2009 | Bragagnini | H04L 29/12009 370/401 |
| 2010/0043053 | A1 | 2/2010 | Wei et al. | |
| 2011/0026466 | A1* | 2/2011 | Zhou | H04L 12/14 370/328 |
| 2011/0075675 | A1* | 3/2011 | Koodli | H04L 12/14 370/401 |
| 2011/0122885 | A1* | 5/2011 | Hedman | H04L 65/1016 370/412 |
| 2011/0141884 | A1* | 6/2011 | Olsson | H04W 24/04 370/225 |
| 2011/0235546 | A1* | 9/2011 | Horn | H04L 12/66 370/254 |
| 2012/0033553 | A1* | 2/2012 | Strulo | H04L 47/10 370/232 |
| 2012/0063300 | A1* | 3/2012 | Sahin | H04W 36/12 370/225 |
| 2012/0290713 | A1* | 11/2012 | Ellis | H04L 12/1407 709/224 |
| 2012/0317269 | A1* | 12/2012 | Weppler | H04L 41/0654 709/224 |
| 2012/0324110 | A1* | 12/2012 | Kohli | H04L 63/0281 709/226 |
| 2013/0041994 | A1* | 2/2013 | Terrien | H04L 43/16 709/223 |
| 2013/0054428 | A1* | 2/2013 | Shaikh | G06Q 30/04 705/30 |
| 2013/0111542 | A1* | 5/2013 | Shieh | H04L 63/0263 726/1 |
| 2013/0142182 | A1* | 6/2013 | Gundavelli | H04W 8/02 370/338 |
| 2013/0208591 | A1* | 8/2013 | Larsen | H04L 63/0281 370/230 |
| 2013/0279521 | A1* | 10/2013 | Perez Martinez | H04L 12/1407 370/468 |
| 2014/0317300 | A1* | 10/2014 | Ludwig | H04W 76/064 709/226 |

FOREIGN PATENT DOCUMENTS

| | | |
|---|---|---|
| CN | 102075336 A | 5/2011 |
| EP | 1 484 887 A2 | 12/2004 |
| EP | 2107728 A1 | 10/2009 |
| JP | H10215248 A | 8/1998 |
| JP | 2004302538 A | 10/2004 |
| JP | 2006-506853 A | 2/2006 |
| JP | 2006-114991 A | 4/2006 |
| JP | 2010517387 A | 5/2010 |
| WO | 2010/112080 A1 | 10/2010 |
| WO | 2011/091682 A1 | 8/2011 |
| WO | 2011099523 A1 | 8/2011 |

OTHER PUBLICATIONS

3GPP TS 23.203 V11.4.0 (Dec. 2011) 3rd Generation Partnership Project; Technical Specification Group Services and System Aspects; Policy and charging control architecture (Release 11).
3GPP TS 29.212 v11.3.0 3rd Generation Partnership Project; Technical Specification Group Core Network and Terminals; Policy and Charging Control (PCC) over Gx/Sd reference point (Release 11).
3GPP TS 29.214 v11.3.0. 3rd Generation Partnership Project; Technical Specification Group Core Network and Terminals; Policy and Charging Control over Rx reference point (Release 11).
Notification of Reasons for Rejection dated Aug. 24, 2015 corresponding to Japanese Patent Application No. 2014-553627.
Security GW according to Carrier Specification that supports a base station channel network of LTE, Tele-communication, Japan, RIC TELECOM May 25, 2011, vol. 28, No. 6, pp. 6-7.
State Intellectual Property Office, People's Republic of China, Office Action for corresponding Patent Application No. 201280071846.3, dated Oct. 27, 2016.
Office Action issued in Japanese Patent Application No. 2016-099842 dated Mar. 19, 2018.
Nokia Siemens Networks et al. S2-113200, Making Un-Subscribe optional at last IP-CAN termination; 2011.
Japanese Patent Office, Notification of Reasons for Rejection corresponding to Japanese Patent Application No. 2016-099842, dated Apr. 17, 2017.
European Patent Office, Office Action corresponding to Appln. No. 12 702 482.6, dated Dec. 8, 2017.
Yangbo Lin Huawei Technoligies Co et al Study Group 16, TD 585 R1 (WP 2/16), "H.248.43 (ex H.248.gmgc) Editor's Output (for Consent)", Apr. 22-May 2, 2008, pp. 1-39.
Korean Office Action corresponding to Application No. 10-2016-7022035, dated Dec. 19, 2018.
European Office Action corresponding to Application No. 12 702 482.6, dated Nov. 26, 2018.
Huawei: "IP-CAN session termination initiated by PCRF", 3GPP Draft; C3-081215_IP-CAN Session Termination Initiated by PCRF (29.212), 3rd Generation Partnership Project (3GPP), Mobile Competence Centre ; 650, Route Des Lucioles ; F-06921 Sophia-Antipolis Cedex ; France, vol. CT NG3, No. Zagreb; Jun. 27, 2008, Jun. 27, 2008 (Jun. 27, 2008), XP050033568, [retrieved on Jun. 27, 2008].
"3rd Generation Partnership Project; Technical Specification Group Services and System Aspects; Policy and charging control architecture; (Release 7); 3GPP TS 23.203", Technical Specification, European Telecommunications Standards Institute (ETSI), 650 Route Des Lucioles, Sophia Antipolis Cedex, F-06921, France, vol. 3-SA2, No. V0.4.0, Feb. 1, 2006 (Feb. 1, 2006), XP014033548.

* cited by examiner

SESSION TERMINATION IN A MOBILE PACKET CORE NETWORK

BACKGROUND OF THE INVENTION

Field of the Invention

The present invention relates to session management in network elements having a gateway function in mobile packet core networks, such as GGSN, S-GW and P-GW. In particular, the present invention relates to session termination in such network elements.

The present invention further relates to policy and charging control over Gx interface and SPI and DPI capabilities in GGSN, S-GW and P-GW network elements.

Related Background Art

Prior art which is related to this technical field can e.g. be found in

3GPP TS 23.203 v11.4.0,
3GPP TS 29.212 v11.3.0, and
3GPP TS 29.214 v11.3.0.

The following meanings for the abbreviations used in this specification apply:

AF=application function
APN=access point name
AVP=attribute value pair
BBERF=bearer binding and event reporting function
CAN=connectivity access network
CLI=calling line identification
DL=downlink
DPI=deep packet inspection
DNS=domain name server
GGSN=gateway GPRS support node
GPRS=general packet radio service
IMEI=international mobile station equipment identity
IMSI=international mobile subscriber identity
IP=Internet protocol
MSISDN=mobile subscriber integrated services digital network number
OCS=online charging system
OFCS=offline charging system
P2P=point to point
PCC=policy and charging control
PCEF=policy control enforcement function
PCRF=policy control rule function
PDN=packet data network
P-GW=packet gateway
S-GW=serving gateway
SPI=shallow packet inspection
SPR=subscription profile repository
TDF=traffic detection function
UE=user equipment
UL=uplink The following problems may occur for a connection between a user equipment (UE) and a mobile packet core network (network).

In case of a network connection outage or congestion, an operator of the network may wish to terminate active sessions which use the problematic network. This way the UE could re-establish the session possibly via another GW or GW node. However, as there is no mechanism for distinguishing between active and inactive sessions, the operator is forced to terminate also inactive sessions.

Further, there may be certain restrictions in the network regarding services or protocols that are allowed to be used. Currently there is a mechanism for restricting the use of such services or protocols (by dropping packets) but that consumes a lot of resources in the GW since UE applications and protocols typically make constant retries that might cause even more UL traffic when services or protocols are restricted. Actually there is no mechanism for automatically terminating those sessions that are using forbidden applications or protocols.

Still further, the operator may wish to force the UE to make a session re-establishment e.g. in order to perform a reconfiguration in the network, e.g. to reconfigure DNS server addresses. Currently there is no mechanism to perform such operation automatically for affected sessions only.

Currently there is no mechanism available that could be used in GGSN/S-GW/P-GW in similar manner for solving the above problems.

If online charging is applied, OCS could terminate the session when the first packet matching a PCC rule requiring termination is detected. This solution, however, has several drawbacks.

That is, the above solution requires extra signaling between PCEF and OCS, and it cannot be used to terminate the session if a change of policy occurs after the first packet matching the PCC rule has been already detected, because then the PCEF will not send any request to the OCS.

SUMMARY OF THE INVENTION

The present invention aims at solving the above problems. In particular, the invention aims at providing a mechanism which enables a gateway device of a mobile packet core network to terminate sessions e.g. at operator's option.

This is achieved by the method and gateway device as defined in the appended claims. The invention may also be implemented by a computer program product.

According to an embodiment of the invention, "terminate" is configured as an action for PCC rule. Whenever data of a session flowing to/from a packet data core network matches a filter that belongs to this rule, the session will be terminated, i.e., a GW initiated session deletion procedure is invoked.

In the following the invention will be described by way of embodiments thereof with reference to the accompanying drawings.

DESCRIPTION OF THE EMBODIMENTS

Figure 1:
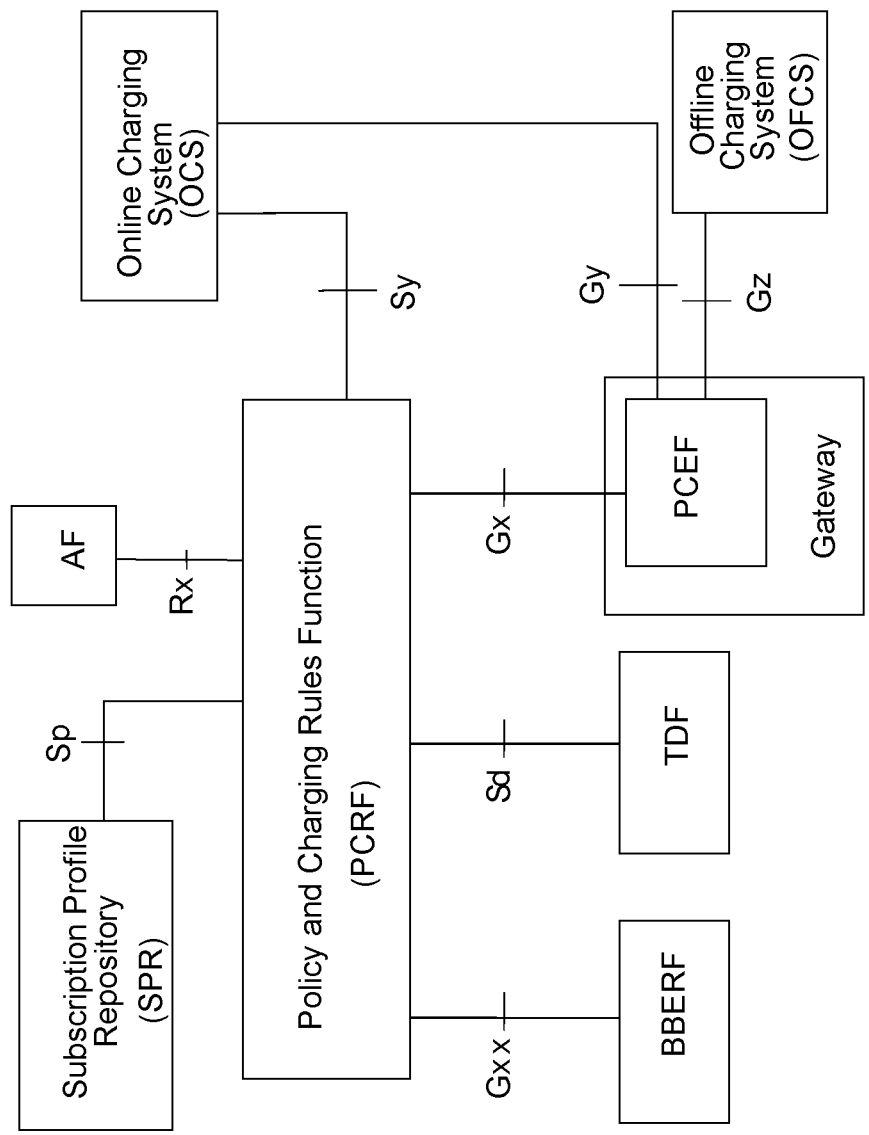
FIG. 1 shows a diagram illustrating a PCC logical architecture in which the invention is applied according to an embodiment thereof.

FIG. 1 shows a diagram illustrating a PCC logical architecture in which the invention may be applied.

Referring to FIG. 1, a Gx interface is located between a PCRF and a PCEF of a gateway. The Gx interface is used for provisioning and removal of PCC rules from the PCRF to the PCEF and transmitting traffic plane events from the PCEF to the PCRF. The Gx interface can be used for charging control, policy control or both by applying AVPs relevant to an application. The Gx interface can also be used for application's traffic detection and control.

FIG. 1 further shows an Sp interface connecting an SPR to the PCRF, an Rx interface connecting an AF to the PCRF, and Sy interface connecting an OCS to the PCRF, a Gxx interface connecting a BBERF to the PCRF, and an Sd interface connecting a TDF to the PCRF. Furthermore, a Gy interface connects the OCS to the PCEF, and a Gz interface connects an OFCS to the PCEF.

A PCC rule represents a set of information enabling the detection of a service data flow and providing parameters for policy control and/or charging control. That is, according to a PCC rule, a packet belonging to a service data flow is detected, service data flow filters within the PCC rule are used for the selection of downlink IP CAN bearers and for the enforcement that uplink IP flows are transported in the correct IP CAN bearer, and the service the service data flow contributes to is identified. In addition, applicable charging parameters and policy control are provided for the service data flow.

The PCEF of the gateway selects a PCC rule for each received packet by evaluating received packets against service data flow filters of PCC rules in the order of the precedence of the PCC rules. When a packet matches a service data flow filter, the packet matching process for that packet is completed, and the PCC rule for that filter is applied.

Figure 2:
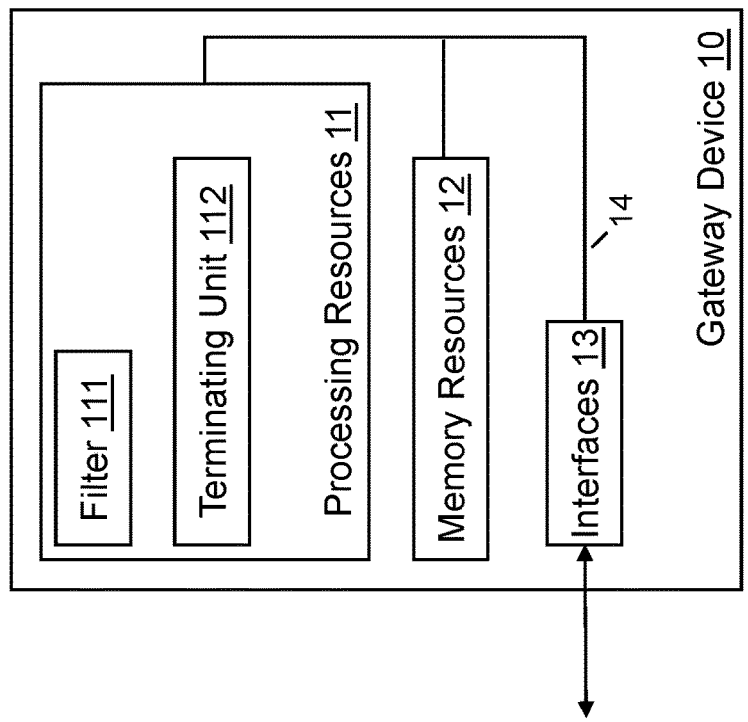
FIG. 2 shows a schematic block diagram illustrating a structure of a gateway device according to an embodiment of the invention.

FIG. 2 illustrates a structure of a gateway device 10 of a mobile packet core network according to an embodiment of the invention, which may contain a PCEF as described above and may be located as gateway in the architecture shown in FIG. 1. The gateway device comprises processing resources 11, memory resources 12 and interfaces 13 which are connected through a link 14. The processing resources 11 comprise a filter 111 and a terminating unit 112.

The filter 111 matches data packets flowing to/from the mobile packet core network, and the terminating unit 112 terminates a session in accordance with an action for the filter when a data packet of the session, which flows to/from the mobile packet core network, matches the filter.

The filter and the action for the filter may be configured as a PCC rule.

The filter and the action for the filter may be received via the interfaces 13, e.g. the Gx interface, and installed in the gateway device 10 by an installing unit (not shown) of the gateway device 10. That is, the filter and the action may be configured locally in the gateway device 10. It is also possible to install the received filter and action for the filter in the gateway device 10 by the PCRF via the Gx interface. Moreover, the installing unit may install the filter and the action for the filter automatically locally in the gateway device 10 when a predefined condition is met.

In the filter, the criteria for matching traffic (data packets) can be for example a UE address range, packet destination address or L7 protocol. By combining these with DPI capabilities, the usage can be extended to any criteria that DPI detection can provide, including specific internet services, hostile P2P applications, protocols, etc.

Figure 3:
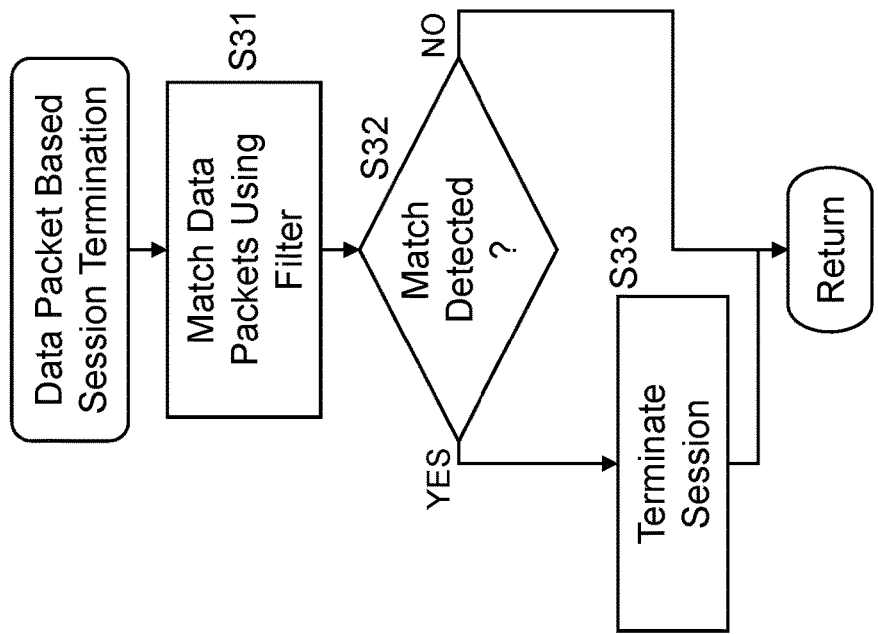
FIG. 3 shows a flowchart illustrating a gateway initiated session deletion procedure according to an embodiment of the invention.

FIG. 3 shows a flowchart illustrating a data packet based session termination which may be performed by the gateway 10 as a gateway initiated session deletion procedure.

In step S31 data packets of sessions flowing to/from a mobile packet core network are matched using a filter. In case a match of a data packet of a session is detected in step S32, in accordance with an action "terminate" for the filter the session is terminated in step S33. Following step S33 or in case not match is detected in step S32, the process may return to step S31.

In the following use examples of the present invention will be described.

Use Example 1: Remove Only Active Sessions in Case of Networking Problems

According to the use example 1, an operator of a mobile packet core network notices that there is no connectivity to a PDN and wishes to prevent overcharging.

At first the operator detects a failure in the network (e.g. link or route failure). Then a rule is enabled and activated in the gateway with an L4 filter that contains UE address ranges that are known to have connection to the PDN; and Rule action TERMINATE.

When a UE sends data packets towards the PDN, traffic (data packets) matches the configured rule and the session is terminated. The UE can make a new session establishment to same APN and may get service via another gateway. In this way, sessions that did not send any data during networking problem do not notice any service break.

Use Example 2: Terminate User Sessions that have Wrong Parameters (Such as DNS Server Address) in Order to Reconfigure them Through Session Re-Establishment According to the use example 2, an operator of a mobile packet core network wishes to take out an outdated DNS server for hardware upgrade.

For this purpose, a replacement DNS server address is configured which is to be given for new sessions established to a specified APN, and a rule is configured and activated in the gateway with an L4 filter that contains the address of the outdated DNS server; and Rule action TERMINATE.

The operator takes out the outdated DNS server from the network for hardware upgrade. When a UE makes a DNS query to the taken out DNS server, traffic (data packets) matches the configured rule and the session is terminated. The UE can make a new session establishment to same APN and get the replacement DNS server address to be used.

When the operator puts the old DNS server back to the network, sessions that did not send any data to the old DNS server during maintenance do not notice any service break.

Use Example 3: Terminate User Sessions that Violate Operator Rules

According to the use example 3, an operator of a mobile packet core network wishes to terminate sessions that use hostile protocols or applications.

A rule is configured and activated in the gateway with an L4/L7 filter (L7 filter only when configuring the rule locally) that contains information about forbidden service (destination port, protocol, URI, etc.); and Rule action TERMINATE.

When a UE uses a forbidden application/service, traffic (data packets) matches the configured rule and the session is terminated. Sessions that use only allowed applications/services do not notice any service break.

Use Example 4: Manage a Specific User Session

According to the use example 4, an operator wishes to disconnect a specific user but only when the user is active.

According to a first alternative, a UE IP address of the user is resolved using existing tools in the gateway, and a rule is configured and activated in the gateway with an L4 filter that contains the UE IP address as source address; and Rule action TERMINATE.

According to a second alternative 2, a CLI command for terminating the user session based on IMSI/MSISDN/IMEI/ etc. is given. The gateway resolves the UE IP address and creates the above rule and filter automatically.

Then the UE session is terminated when the UE sends the next packet.

The above described (PCC) rules with action TERMINATE may be configured locally in the gateway. This solution can be used in GGSN and S-GW where there is no Gx interface. This, too, allows a manual implementation of network level features as specified in use examples 1, 2 and 3.

The above described (PCC) rules with action TERMINATE may further be installed by PCRF via Gx interface. This may be the standard way for implementing network level features as specified in use example 3. The TERMINATE action can be described as new value of Flow-Status AVP which is part of Flow-Information AVP in Charging-Rule-Install AVP (Gx) and Qos-Rule-Definition AVP (Gxx), or a new AVP for this specific purpose.

The above described (PCC) rules with action TERMINATE may further be installed automatically, locally by a gateway application based on predefined conditions. This implementation may be adopted in use examples 1 and 2.

According to an aspect of the invention, an apparatus of a mobile packet core network, such as e.g. the gateway device 10 shown in FIG. 2, is provided which comprises matching means for matching data packets flowing to/from the mobile packet core network, and terminating means for terminating a session in accordance with an action for the matching means when a data packet of the session, which flows to/from the mobile packet core network, matches the matching means.

The apparatus may further comprise receiving means for receiving the matching means and the action for the matching means, and installing means for installing the received matching means and action for the matching means in the apparatus.

Alternatively or in addition, the apparatus may comprise installing means for installing the matching means and the action for the matching means automatically locally in the apparatus when a predefined condition is met.

The matching means, terminating means and installing means may be implemented by the processing resources 11 shown in FIG. 2, which may access the memory resources 12 and interfaces 13 for this purpose. The receiving means may be implemented by the interfaces 13.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
    detecting that there is no connectivity to a mobile packet data network due to a link or route failure;
    in response to the detecting, enabling and activating a rule in a gateway device of the mobile packet core network, with a filter that includes at least one of a specific service, a specific application, a specific protocol, an address range of user equipments that are known to have a connection to the mobile packet data network, or a packet destination address, wherein the rule is provided by a policy and charging rules function;
    detecting, by the gateway device, when a data packet flowing to or from the mobile packet core network matches the filter;
    terminating, by the gateway device a session when a data packet of the session, which flows to or from the mobile packet core network, matches the filter;
    maintaining, by the gateway device, the session when the session does not send any data during a period when there is no connectivity to the mobile packet data network; and
    establishing, in association with at least one session that was previously terminated, at least one new session via the gateway device or another gateway device.

2. The method of claim 1, comprising:
    configuring the filter and an action for the filter in the gateway device locally, or
    installing the filter and the action for the filter in the gateway device by a policy control and charging rules function via an interface that is between the policy and charging rules function and a function of the gateway device, or
    installing the filter and the action for the filter automatically locally in the gateway device when a predefined condition is met.

3. The method of claim 2, wherein the action is described as a value of a flow status attribute value pair or as an attribute value pair for terminating a session.

4. A gateway device of a mobile packet core network, comprising:
    a processor; and
    a memory, wherein the processor and the memory are configured to cause the gateway device at least to:
    enable and activate a rule with a filter, wherein the rule is provided by a policy and charging rules function;
    detect when a data packet flowing to or from the mobile packet core network matches the filter, the filter includes at least one of a specific service, a specific application, a specific protocol, an address range of user equipments that are known to have connection to the mobile packet data network, or a packet destination address;
    terminate a session when the data packet of the session, which flows to or from the mobile packet core network, matches the filter;
    maintain the session when the session does not send any data during a period when there is no connectivity to the mobile packet data network; and
    establish, in association with at least one session that was previously terminated, at least one new session via the gateway device or another gateway device.

5. The gateway device of claim 4, wherein the processor and the memory are further configured to cause the gateway device at least to:
    receive the filter and an action for the filter; and
    install the received filter and action for the filter in the gateway device.

6. The gateway device of claim 5, wherein the action is described as a value of a flow status attribute value pair or as an attribute value pair for terminating a session.

7. The gateway device of claim 4, wherein the processor and the memory are further configured to cause the gateway device at least to:

install the filter and an action for the filter automatically locally in the gateway device when a predefined condition is met.

8. The gateway device of claim 4, wherein the processor and the memory are further configured to cause the gateway device at least to:
configure the filter and an action for the filter in the gateway device locally, or
install the filter and the action for the filter in the gateway device by a policy control and charging rules function via the interface that is between a policy and charging rules function and a function of the gateway device, or
install the filter and the action for the filter automatically locally in the gateway device when a predefined condition is met.

9. The gateway device of claim 4, wherein the filter further comprises at least one of the following: a specific service, a specific application, or a specific protocol.

10. A non-transitory computer-readable storage medium having stored thereon a computer program product including a program for a processor of a gateway device of a mobile packet core network, comprising software code portions for performing, when the program is run on the processor:
enabling and activing a rule with a filter, wherein the rule is provided by a policy and charging rules function;
detecting when a data packet flowing to or from the mobile packet core network matches a filter, the filter including at least one of a specific service, a specific application, a specific protocol, an address range of user equipments that are known to have connection to the mobile packet data network, or a packet destination address;
terminating a session when the data packet of the session, which flows to or from the mobile packet core network, matches the filter;
maintaining a session when the session does not send any data during a period when there is no connectivity to the mobile packet data network;
establishing, in association with at least one session that was previously terminated, at least one new session via the gateway device or another gateway device.

11. The non-transitory computer-readable storage medium of claim 10, comprising further software code portions for performing:
installing the filter and an action for the filter in the gateway device which are received via an interface that is between a policy and charging rules function and a function of the gateway device, or
installing the filter and the action for the filter automatically locally in the gateway device when a predefined condition is met.

12. A method comprising:
enabling and activating a rule in a gateway device of a mobile packet core network, with a filter that includes at least one of a specific service, a specific application, a specific protocol, an address range of user equipments that are known to have a connection to a mobile packet data network, or a packet destination address, wherein the rule is provided by a policy and charging rules function;
detecting, by the gateway device, when a data packet flowing to or from the mobile packet core network matches the filter;
terminating, by the gateway device, a session when a data packet of the session, which flows to or from the mobile packet core network, matches the filter;
maintaining, by the gateway device a session when the session does not send any data during a period when there is no connectivity to the mobile packet data network; and
establishing, in association with at least one session that was previously terminated, at least one new session via the gateway device or another gateway device.

* * * * *